United States Patent
Krajewski et al.

(10) Patent No.: US 6,994,350 B2
(45) Date of Patent: Feb. 7, 2006

(54) CRUSH ZONE AND METHOD FOR INTRODUCING CRUSH ZONE INTO VEHICLE STRUCTURE

(75) Inventors: Paul E. Krajewski, Sterling Heights, MI (US); Alan (Aihua) A. Luo, Troy, MI (US); Susan E. Hartfield-Wünsch, Livonia, MI (US); Patrick J. McNamara, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/402,636

(22) Filed: Mar. 28, 2003

(65) Prior Publication Data

US 2004/0189049 A1   Sep. 30, 2004

(51) Int. Cl.
B62D 25/08         (2006.01)

(52) U.S. Cl. ............................................... 276/187.03

(58) Field of Classification Search ............ 293/132–3, 293/121–2, 102, 110; 296/187.03, 187.08–9, 296/203.01–2, 204–5; 180/311

See application file for complete search history.

(56) References Cited

U.S. PATENT DOCUMENTS

| | | | |
|---|---|---|---|
| 3,856,584 A | | 12/1974 | Cina |
| 3,983,962 A | * | 10/1976 | Torke .......................... 188/377 |
| 3,998,485 A | * | 12/1976 | Putter et al. ................ 293/133 |
| 4,023,652 A | * | 5/1977 | Torke .......................... 188/377 |
| 4,152,012 A | * | 5/1979 | Reidelbach et al. ......... 280/784 |
| 4,160,543 A | * | 7/1979 | Dill et al. .................... 266/252 |
| 4,194,763 A | * | 3/1980 | Reidelbach et al. ......... 280/784 |
| 4,766,664 A | | 8/1988 | Benedyk |
| 5,314,229 A | * | 5/1994 | Matuzawa et al. ...... 296/187.09 |
| 5,458,393 A | | 10/1995 | Benedyk |
| 5,948,185 A | | 9/1999 | Krajewski et al. |
| 5,972,134 A | * | 10/1999 | Buschsieweke et al. .... 148/567 |
| 6,019,419 A | | 2/2000 | Browne et al. |
| 6,477,774 B1 | | 11/2002 | Marando et al. |
| 6,648,384 B2 | * | 11/2003 | Nees et al. .................. 293/132 |
| 2003/0075951 A1 | * | 4/2003 | Hanakawa et al. ......... 296/188 |
| 2003/0090127 A1 | * | 5/2003 | Saeki .......................... 296/188 |
| 2004/0046404 A1 | * | 3/2004 | Kim ............................ 293/133 |

* cited by examiner

*Primary Examiner*—H. Gutman
(74) *Attorney, Agent, or Firm*—Kathryn A. Marra

(57) ABSTRACT

The present invention involves a method to produce crush zones in aluminum structures using controlled application of retrogression heat treatment. Selected areas of a tubular rail are retrogression heat treated to locally lower the tensile yield strength. As a result, during a crash event, initial deformation is localized in the crush zone enabling the crush pattern to be designed directly into the structure.

12 Claims, 3 Drawing Sheets

CRUSH ZONE AND METHOD FOR INTRODUCING CRUSH ZONE INTO VEHICLE STRUCTURE

FIELD OF THE INVENTION

The present invention relates generally to vehicle structural rails subject to crush forces in the event of frontal impacts, and more particularly, to a crush zone having alternating regions of relatively high and low tensile yield strengths.

BACKGROUND OF THE INVENTION

Current production automobiles include a body formed of a plurality of longitudinal structural members. In a front engine automobile of this type, a frontal impact has three principle paths for impact force transmission to and through the vehicle's structure—two outer paths including upper and lower longitudinal frame members and a central path including the engine, transmission and possibly the engine cradle.

In a frontal impact at sufficiently high speeds, all three load paths are functional to absorb and dissipate the vehicle's energy as it rapidly decelerates. Testing has shown that the outer load paths together dissipate 40% to 70% of the vehicle's energy, while the central path dissipates the remainder. The longitudinal frame members are designed to include crush zones to dissipate energy by deforming at force levels that will provide passenger compartment decelerations consistent with occupant safety requirements.

Crush zones are typically designed into vehicle structures by including geometric features that localize deformation such as thinner cross sections or depressions/indentations in the structure. Another method contemplates incorporating different materials with better crush performance into the vehicle structure to form a "crush box" which provides the desired energy dissipation function. However, each of these techniques require an adaptation of the vehicle structure which may compromise the structural stiffness, as well as increase the cost and complexity of the vehicle's structure. Thus, there is a need for technology to introduce a crush zone into a vehicle structure without significantly impacting the structural stiffness, cost and complexity of the vehicle structure.

SUMMARY OF THE INVENTION

It is therefore an object of the present invention to provide a vehicle structure in which a crush zone is provided as a pattern of locally reduced tensile yield strength regions in a structural member. As a result, during a crash event, initial deformation is localized in these regions enabling the crush pattern to be designed directly into the frame rail.

It is another object of the present invention to provide a method for introducing a crush zone into a vehicle structure whereby a retrogressive heat treatment is selectively applied to a structural member for providing locally reduced tensile yield strength regions.

In one aspect of the present invention, a crush zone for a vehicular structure includes a longitudinal frame rail segment having a plurality of first spaced apart bands and a plurality of second spaced apart bands interleaved between one another. The first spaced apart bands have a yield strength which is significantly less than the yield strength of the second spaced apart bands. The present invention further contemplates varying the dimensions and locations of the first and second spaced apart bands to obtain the desired crush response. In addition, the present invention contemplates varying the yield strength gradients at the interface between the first and second spaced apart bands.

In another aspect, the present invention provides a method for introducing a crush shown into a vehicular structure by heat treating a portion of the frame to form a plurality of first and second spaced apart bands interleaved between one another. Specifically, by locally heat treating the area adjacent the first spaced apart bands, the yield strength of the material within the first spaced apart band is lowered relative to the yield strength of the second spaced apart bands. The present invention contemplates a retrogressive heat treatment of an aged hardenable alloy for forming the plurality of first spaced apart bands.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

The present invention relates to a structural component of a vehicle having a crush zone and a method for introducing the crush zone. Specifically, the crush zone includes alternating regions of relatively high and low tensile yield strengths. The present invention has particular utility for age hardenable aluminum alloy frame rails in which a controlled application of retrogression heat treatment is applied to form the low yield strength regions. Specifically, selected areas of a tubular rail or extrusion may be retrogression heat treated to locally lower the yield strength. As a result, during a crash event, initial deformation is localized in these areas enabling the crush pattern to be designed into the structure.

Figure 1:
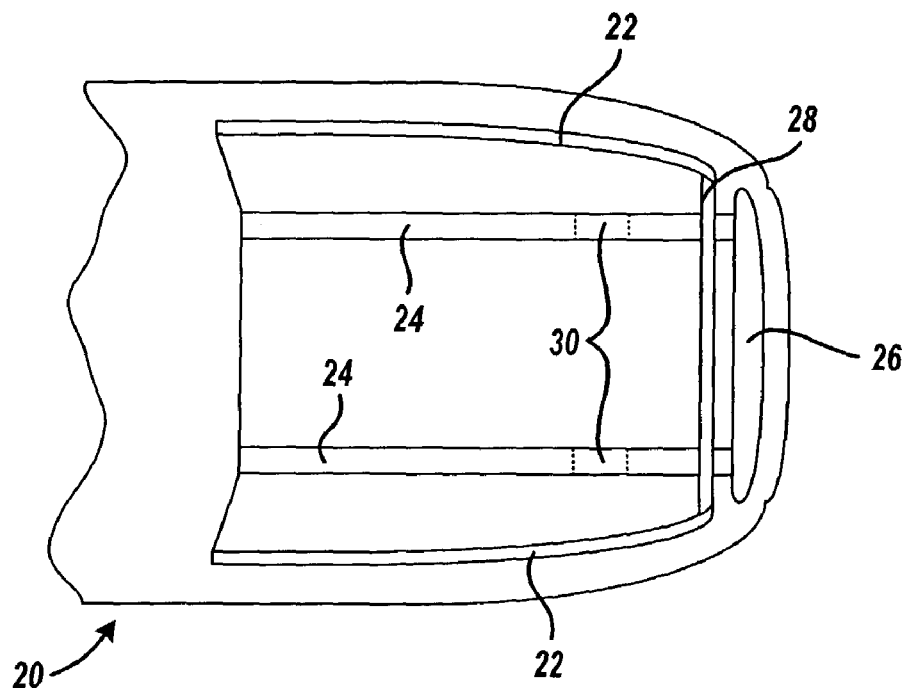
FIG. 1 is a schematic view of the forward portion of a vehicle incorporating a crush zone in accordance with the present invention.

Referring now to FIG. 1, an automobile vehicle 20 includes a pair of upper structural rails 22 and a pair of lower structural rails 24. A bumper 26 is typically supported, either directly or indirectly, at the end of lower frame rails 24. Similarly, a cross body member 28 such as a radiator support structure extends between upper side rails 22. Crush zones 30 are formed in lower longitudinal frame rails 24 to selectively control deformation of the lower frame rails 24 within a desired crush zone during a crash event. While the present invention is described with particular reference to the lower frame rails 24, one skilled in the art will recognize that a crush zone could be for need in the upper rails 22 or other structural members of the vehicle in accordance with the present invention.

Figure 2:
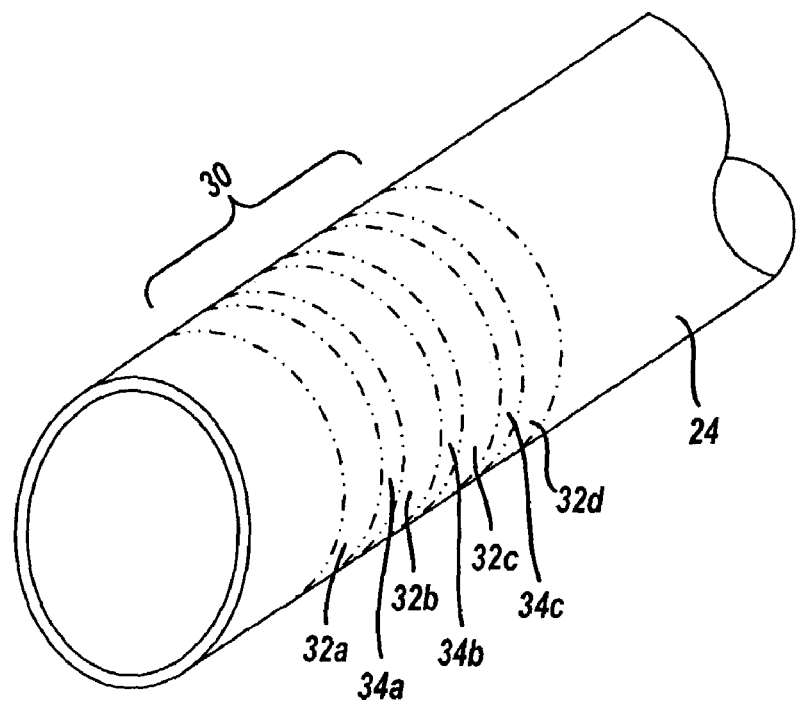
FIG. 2 illustrates a portion of a longitudinal frame rail having a crush zone formed near an end thereof.
Figure 3:
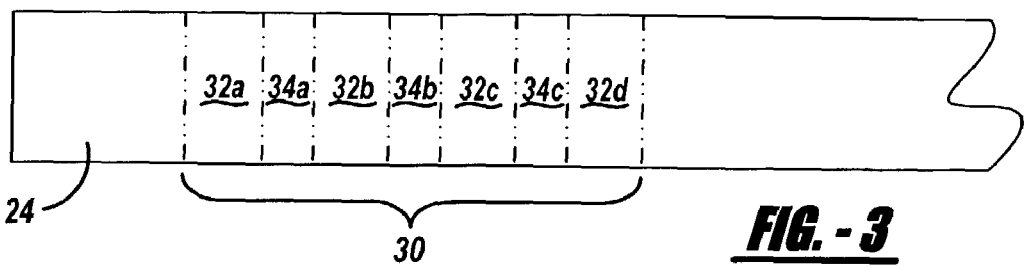
FIG. 3 is a plan view of the frame rail illustrated in FIG. 2.
Figure 4:
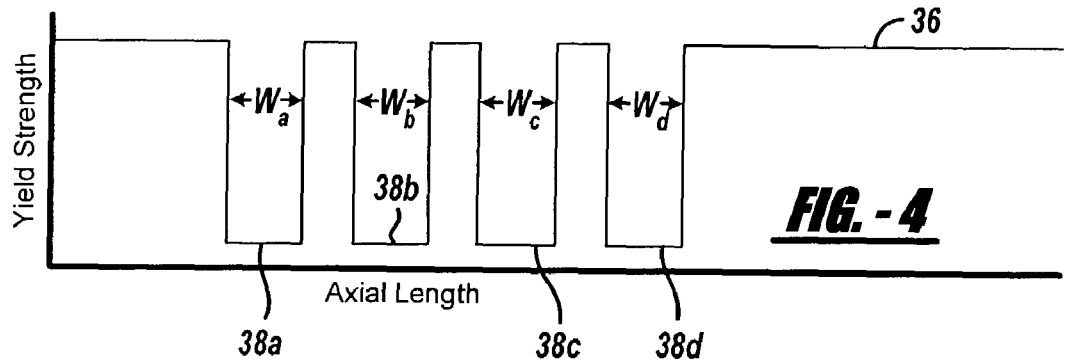
FIG. 4 illustrates a plot of the yield strength profile of the frame rail through the crush zone area.

As best seen in FIGS. 2 and 3, the crush zone 30 includes a set of locally retrogressed regions. These locally retrogressed regions define a plurality of first spaced apart bands 32a–d and a plurality of second spaced apart bands 34a–c interleaved between the first bands 32a–d. Thus, the crush zone 30 is defined by the first bands 32a–d having a lower yield strength than the second bands 34a–c which preferably have a yield strength approximately equal to the remainder of the longitudinal rail 24. For example in FIG. 4, a yield strength profile curve 36 is illustrated as a function of the axially length along longitudinal rail 24. Regions of locally reduced yield strength are represented at regions 38a–38d of yield strength profile curve 36. Specifically as illustrated, the crush zone abruptly transitions from a relatively high yield strength to a relatively low yield strength in a step wise manner. Thus, the interface between the first bands 32a–d and second bands 34a–c has a high yield strength gradient. Also, as specifically illustrated in FIG. 4, the yield strength in each of the first band regions 32a–d is approximately equal and the width of each first band 32a–d is approximately equal. As presently preferred, the locally reduced yield strength is on the order of approximately 90% to 60% of the yield strength the remainder of longitudinal rail 24 including second bands 34a–c.

Figure 5:
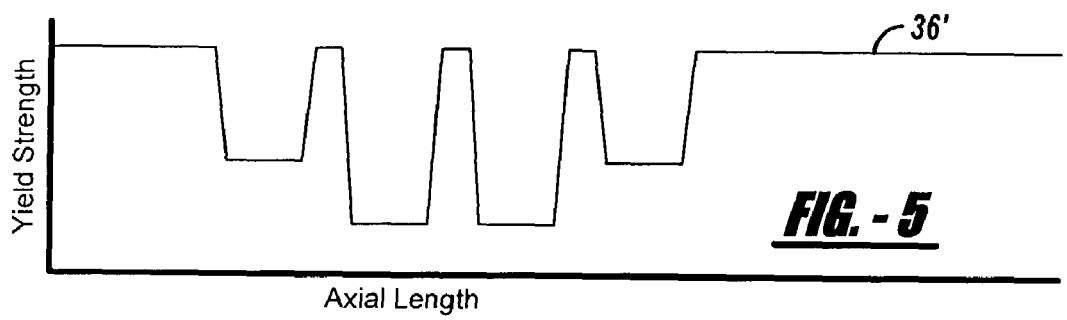
FIG. 5 is an alternate yield strength profile wherein the yield strength of each of the plurality of bands varies and a yield strength gradient exists at the interface between the first and second bands.
Figure 6:
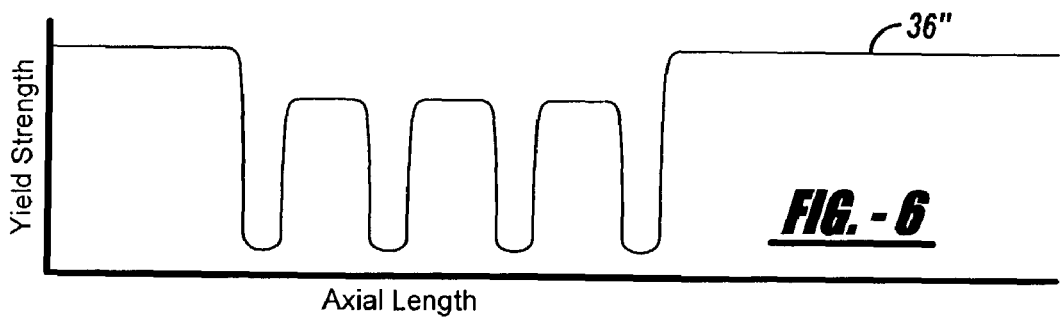
FIG. 6 is a yield strength profile through the crush zone wherein the yield strength gradient between the first and second bands is non-linear.
Figure 7:
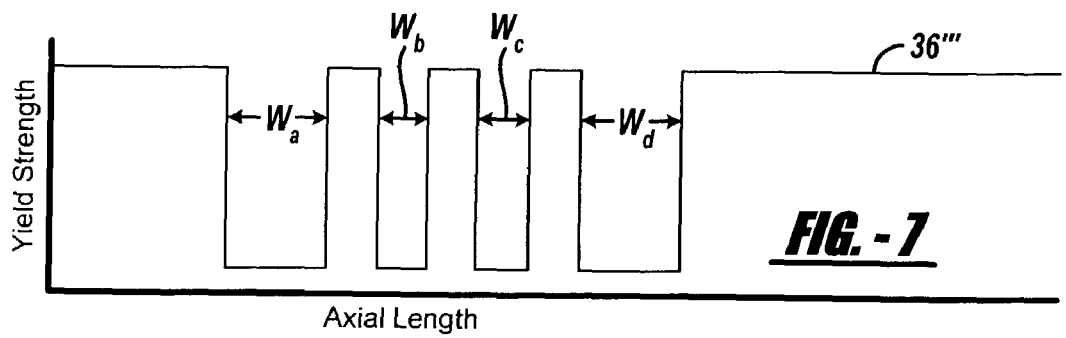
FIG. 7 is a yield strength profile through the crush zone wherein the size of the various low yield strength bands varies.

The present invention contemplates the ability to vary and modify the yield strength profile curve as a function of the axial length of the longitudinal rail 24 in many ways. In this manner, the present invention may be utilized to precisely design a crush zone 30 for a given application. With reference now to FIGS. 5–7, a variety of yield strength profile curves are illustrated. Specifically, with reference to FIG. 5, yield strength profile 36' illustrates a profile in which the interface between the high and low yield strength regions is a more gradual gradient than illustrated in FIG. 4. Also, the relative local reduction between the various low yield strength regions varies with the axial location along the length of the longitudinal rail. As illustrated in FIG. 6, a yield strength profile curve 36" is provided in which the interface between the low yield strength regions 32a–d and high yield strength regions 34a–c is nonlinear. Furthermore, the yield strength profile curve 36" illustrates a design whereby the yield strength of the second bands 34a–c is lower than the yield strength of the remaining material of the longitudinal rail 24. With reference now to FIG. 7, a yield strength profile 36'" is illustrated in which the width of the low yield strength bands 32a–d varies along the axial length of the longitudinal rail. Specifically, as illustrated in FIG. 7 the width $W_a$ and $W_d$ of regions 32a and 32d are significantly wider than the width $W_b$ and $W_c$ of regions 32b and 32c.

Thus, as represented in FIGS. 4–7, the yield strength profile curve within the crush region 30 may be uniquely varied for a given application, and one skilled in the art would readily recognize that these and other variations may be utilized individually or in combination to tailor the crush zone for a given application.

As discussed above, the present invention may be utilized in structural members of various compositions, and has particular utility with age hardenable aluminum alloys. Typically 6XXX series alloys such as 6061 or 6063 are used for rail-type structures. In addition, the present invention may be applicable to work hardened aluminum alloys such as 5XXX series alloys because of the recovery of work hardening associated with a heat treatment. Furthermore, the present invention may be utilized with metal alloys other than aluminum which provide the desirable yield strength variation upon heat treatment.

As presently preferred, the crush zone, and specifically the regions of locally reduced yield strength are provided by a controlled application of retrogression heat treatment (RHT). Generally speaking, the retrogression heat treatment process is a heat treatment which returns the metallic material to a pre-hardened or pre-tempered state. With specific application to age-hardenable aluminum alloy, the retrogression heat treatment is performed by rapidly heating the aluminum alloy to a sufficient temperature to provide full or partial softening thereof, followed by relatively rapid cooling. Notwithstanding this cooling, the aluminum alloy retains the full or partial softening characteristics for a period of time. RHT is preferably applied using an induction coil; however, other methods can be used to apply the heat treatment including lasers, oil, conduction by metal plates or inserts, salt baths, focused heat lamps or other methods of providing a controlled localized heat treatment to a structural rail. In addition to a controlled application of heat, a rapid cooling of the structural frame member is required to achieve the desired yield strength profile curves. Quenching from the heat treatment temperatures can be performed using a variety of cooling methods including forced air cooling, water cooled contact tool or other suitable gas or liquid cooling processes.

Figure 8:
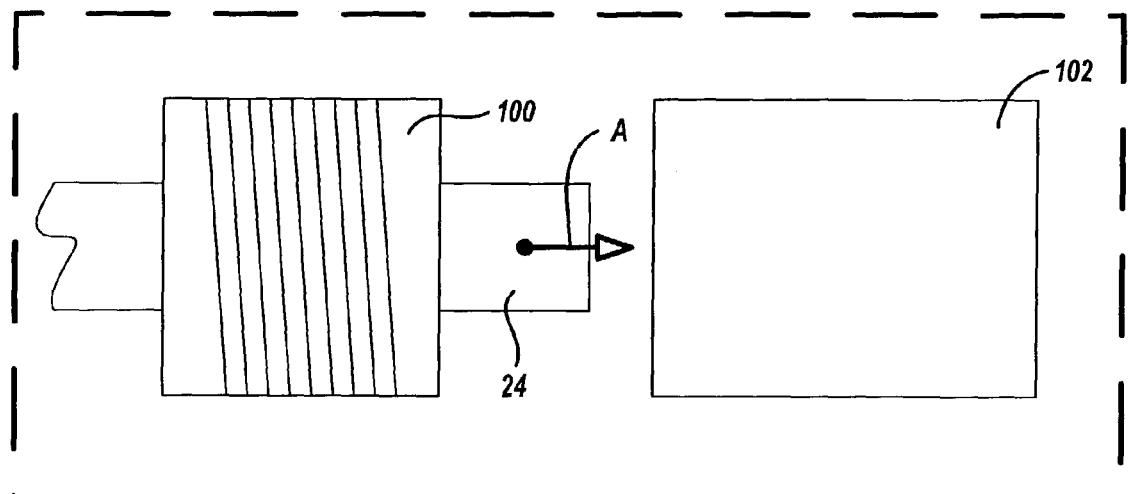
FIG. 8 is a schematic illustration of an induction heating system for retrogressively treating a frame member.
Figure 9:
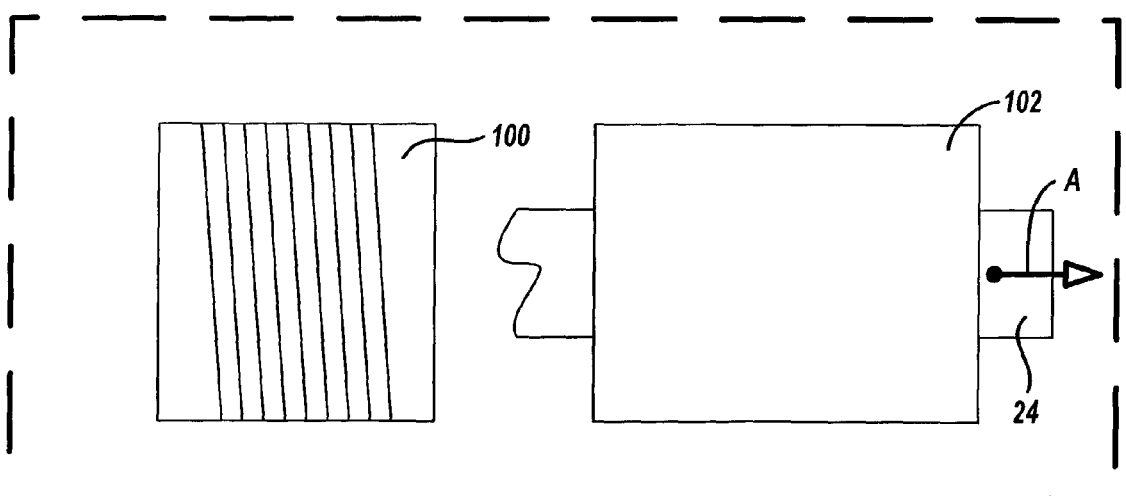
FIG. 9 is a schematic illustration of cooling of the structural frame member.

With reference now to FIGS. 8 and 9, a schematic of the retrogression heat treatment process is illustrated. Specifically, in FIG. 8, the structural frame member 24 is introduced into an induction coil 100 where it is processed for a suitable time and at a suitable temperature to achieve the desired retrogression heat treatment. The bands 32a–d which define the local regions of low yield strength are heated by induction coil 100. The structural member 24 is moved through the coil 100 as indicated by the arrow A at a rate sufficient to provide the defined regions. Once the heat treatment is completed, the frame member 24 moves through a quenching ring 102 as illustrated in FIG. 9. The quenching ring rapidly cools the heat treated structural rail 24 thereby forming the desired crush zone 30.

The specific processing parameters for the retrogression will vary depending upon the material and geometry of the structural rail 24. However, in typical application, the retrogression heat treatment will heat the first bands to a temperature between 250° C. and 500° C. for a time of between 0.1 to 10 seconds. More preferably in age hardenable aluminum applications, the retrogression heat treatment locally heats the frame rail to a temperature between about 350° C. and between about 400° C. for a time period about 1.5 seconds and 5 seconds. The structural rail 24 is heated as quickly as possible, preferably at a rate greater than 25° C./seconds and more preferably at a rate in the range of 25°

C./seconds to 1000° C./seconds. Thereafter, the structural rail 24 is cooled as rapidly as possible to an ambient temperature, preferably at a rate greater than −13° C./seconds and more preferably at a rate of in the range of −13° C./seconds to −500° C./seconds.

The present invention will now be described with application to an extruded aluminum tube having a 15 cm diameter and 4 mm wall thickness. The tubes were extruded and supplied in press-quenched (air-cooled) T4 condition. Table 1 lists the chemical composition of the material. In the experiment, one tube was treated in accordance with the present invention and two tubes were treated by conventional means as hereinafter described as reference samples.

TABLE 1

Chemical Composition
(Elemental concentrations in % weight - balance is aluminum)

| Material | Si | Fe | Cu | Mg | Ti | Others Each | Total |
|---|---|---|---|---|---|---|---|
| 6063-T4 | 0.450 | 0.203 | 0.020 | 0.540 | 0.020 | 0.050 | 0.150 |

Three heat treatment schedules were applied to 6063-T4 tubes as shown in Table 2. Artificial aging treatments (T6 and T7) were carried out in an electric resistance furnace. Specifically, Example 1 and Reference A were heat treated for eight hours at 175° to provide a T6 condition. Reference B was heat treated for five hours at 218° to provide a T7 condition.

TABLE 2

Heat Treatment Schedules and Tensile Yield Strength

| Example | Alloy/Temper | Aging Treatment | Retrogression Heat Treatments | Yield Strength (MPa) |
|---|---|---|---|---|
| 1 | 6063-T6/RHT | 8 hours @ 175° C. | 5 seconds @ 370–400° C. | 130 |
| Ref. A | 6063-T6 | 8 hours @ 175° C. | No | 210 |
| Ref. B | 6063-T7 | 5 hours @ 218° C. | No | 190 |

Next, a retrogression heat treatment was performed on Example 1 in an induction heating equipment. Specifically, the aluminum tube passed through a 15 cm copper induction coil that was energized with high frequency electrical current. The frequency was fixed at 9.6 kHz and the maximum power level was 400 kW. The tube then passed through a quench ring where room temperature water was sprayed directly on to the aluminum tube. The quench ring was 30 cm beyond the end of the induction coil. The time elapsed between exiting the coil and quench depends on the scan speed varying between 11 and 17 seconds. Optimum RHT parameter, i.e., 6% (1.1 meters per minute) scan speed with 70% to 90% heat input determined by a designed experiment were used. The temperature measurements on the tube confirm that such an RHT produced about five seconds of heating at 370° C. to 400° C. The tensile yield strength for each heat treating condition is shown in Table 2 above.

Performance of the present invention was evaluated using drop-silo crush testing. In this test, a 600 mm long rail is fixtured to a test system. Then, a drop-head of 396 kg was dropped from a height of 13 meters, resulting in a velocity of 30 miles per hour when hitting the test rail. Various parameters including drop-head force, velocity and displacement were recorded for crush performance analysis from this data is summarized in Table 3 below.

TABLE 3

Drop-Silo Test Results

| Example | Alloy/Temper | Energy Absorbed (kNm) | Maximum Drop-Head Displacement (mm) | Maximum Rail Crush (mm) |
|---|---|---|---|---|
| 1 | 6063-T6/RHT | 11.2 | 151 | 95 |
| Ref. A | 6063-T6 | 3.7 | 100 | 9 |
| Ref. B | 6063-T7 | 7.2 | 118 | 52 |

As can be seen in the table, Example 1 demonstrates improved crush performance in terms of energy absorption, maximum drop-head displacement and maximum rail crush.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A crush zone for a vehicular structure comprising a monolithic longitudinal frame rail segment having a generally continuous peripheral wall, a plurality of first spaced apart bands formed in said longitudinal frame rail and a plurality of second spaced apart bands formed in said longitudinal frame rail and interleaved between said plurality of first spaced apart bands, each of said plurality of first spaced apart bands having a locally reduced first yield strength which is at least 10% less than a second yield strength of said plurality of second spaced apart bands, wherein said locally reduced yield strength is lowered by retrogression heat treatment that returns said plurality of first spaced apart bands to a substantially pre-hardened state.

2. The crush zone of claim 1 wherein each of said plurality of first spaced apart bands are of equal axial length.

3. The crush zone of claim 1 wherein each of said first yield strengths of said plurality of first spaced apart bands are approximately equal.

4. The crush zone of claim 1 wherein said plurality of first spaced apart bands further comprises a first band and a second band, said first band having a yield strength which is significantly less than a yield strength of said second band.

5. A vehicle structure characterized by a crush control system for controlling energy absorption during a frontal impact on the vehicle structure, the vehicle structure comprising a monolithic frame rail segment of a frame rail having a generally continuous peripheral wall with a set of locally retrogressed regions formed therein, each of said set of locally retrogressed regions having a first yield strength which is at least 10% less than a second yield strength of said frame rail segment, wherein said first yield strength is lowered by retrogression heat treatment that returns said set of locally retrogressed regions to a substantially pre-hardened state.

6. The vehicle of claim 5 wherein each of said first yield strengths of said set of locally retrogressed regions are approximately equal.

7. The vehicle of claim 5 wherein said set of locally retrogressed regions further comprises a first subset of locally retrogressed regions and a second subset of locally retrogressed regions, said first subset of locally retrogressed regions having a yield strength which is significantly less than a yield strength of said second subset of locally retrogressed regions.

8. The vehicle of claim 5 wherein each of said set of locally retrogressed regions are of approximately equal axial length.

9. The vehicle of claim 5 wherein said set of locally retrogressed regions are equally spaced along said frame rail segment.

10. A crush zone for a vehicular structure comprising a longitudinal frame rail segment having a peripheral wall, a plurality of first spaced apart bands formed in said longitudinal frame rail, said plurality of first spaced apart bands further comprises a first band and a second band, said first band having a yield strength which is significantly less than a yield strength of said second band, and a plurality of second spaced apart bands formed in said longitudinal frame rail and interleaved between said plurality of first spaced apart bands each of said plurality of first spaced apart bands having a first yield strength which is at least 10% less than a second yield strength of said plurality of second spaced apart bands.

11. A vehicle structure characterized by a crush control system for controlling energy absorption during a frontal impact on the vehicle structure, the vehicle structure comprising a frame rail segment of a frame rail having a peripheral wall with a set of locally retrogressed regions formed therein, said set of locally retrogressed regions further comprises a first subset of locally retrogressed regions and a second subset of locally retrogressed regions, said first subset of locally retrogressed regions having a yield strength which is significantly less than a yield strength of said second subset of locally retrogressed regions, each of said set of locally retrogressed regions having a first yield strength which is at least 10% less than a second yield strength of said frame rail segment.

12. A vehicle structure characterized by a crush control system for controlling energy absorption during a frontal impact on the vehicle structure, the vehicle structure comprising a frame rail segment of a frame rail having a peripheral wall with a set of locally retrogressed regions formed therein, said set of locally retrogressed regions being equally spaced along said frame rail segment, each of said set of locally retrogressed regions having a first yield strength which is at least 10% less than a second yield strength of said frame rail segment.

* * * * *